United States Patent
Lang et al.

(10) Patent No.: US 10,003,568 B2
(45) Date of Patent: Jun. 19, 2018

(54) DYNAMICALLY ASSIGNING NETWORK ADDRESSES

(71) Applicant: INTERNATIONAL BUSINESS MACHINES CORPORATION, Armonk, NY (US)

(72) Inventors: Jakob C. Lang, Boeblingen (DE); Angel Nunez Mencias, Boeblingen (DE); Thomas Pohl, Boeblingen (DE); Martin Troester, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 14/935,865

(22) Filed: Nov. 9, 2015

(65) Prior Publication Data

US 2016/0134584 A1 May 12, 2016

(30) Foreign Application Priority Data

Nov. 12, 2014 (GB) .................................. 1420129.7

(51) Int. Cl.
*H04L 29/12* (2006.01)
*G06F 9/455* (2018.01)

(52) U.S. Cl.
CPC ...... *H04L 61/2015* (2013.01); *G06F 9/45558* (2013.01); *H04L 61/2053* (2013.01); *G06F 2009/45575* (2013.01); *G06F 2009/45595* (2013.01)

(58) Field of Classification Search
CPC ............. H04L 12/4641; H04L 61/2015; H04L 61/2053; H04L 61/6022; G06F 9/485; G06F 9/45558; G06F 9/45533; G06F 2009/45575; G06F 2009/45595; G06F 11/1458
USPC ........................................................ 709/220
See application file for complete search history.

(56) References Cited

U.S. PATENT DOCUMENTS

| | | | |
|---|---|---|---|
| 7,231,660 B1 | 6/2007 | Daude et al. | |
| 7,289,462 B1 | 10/2007 | Mizell et al. | |
| 7,558,845 B2 * | 7/2009 | Finley, Jr. | ........... H04L 61/2015 709/220 |

(Continued)

FOREIGN PATENT DOCUMENTS

EP 2216718 A1 8/2010

OTHER PUBLICATIONS

Search Report for GB1420129.7 dated May 15, 2015, pp. 1-3.

(Continued)

*Primary Examiner* — Ruolei Zong
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Dynamically assigning network addresses provided by a server in a network to virtual network adapters in virtual machines, in which a reassignment of the assigned network addresses due to suspending virtual machines is prevented. Network addresses of the virtual machines in the network are logged. Network addresses are combined with information about suspending and/or resuming virtual machines by a control instance. Information about the network addresses of suspended virtual machines for its virtual network adapters with dynamically assigned network addresses is sent to the server.

20 Claims, 6 Drawing Sheets

(56) References Cited

U.S. PATENT DOCUMENTS

| | | | |
|---|---|---|---|
| 7,587,518 B2 | 9/2009 | Bahl | |
| 7,792,942 B1 | 9/2010 | Regan et al. | |
| 8,880,687 B1* | 11/2014 | Chandrachari | H04L 41/0816 709/224 |
| 2006/0155563 A1 | 7/2006 | Banerjee et al. | |
| 2006/0218252 A1* | 9/2006 | Ford | H04L 61/2015 709/220 |
| 2007/0162594 A1 | 7/2007 | Henry et al. | |
| 2010/0205304 A1* | 8/2010 | Chaturvedi | H04L 61/2015 709/226 |
| 2011/0119382 A1 | 5/2011 | Shaw, Jr. et al. | |
| 2012/0233282 A1* | 9/2012 | Voccio | G06F 9/45558 709/212 |
| 2014/0298331 A1* | 10/2014 | Shimogawa | G06F 9/45533 718/1 |

OTHER PUBLICATIONS

Oracle, "Assigning a Reserved IP Address to a DHCP Client," Oracle Corporation, downloaded from internet Oct. 30, 2015, p. 1.

Juniper, "How to Reserve an IP Address for a Network Device when NetScreen Firewall Acts as a DHCP Server," downloaded from internet Oct. 30, 2015, pp. 1-3.

Microsoft, "Using Client Reservations," Jan. 21, 2015, (downloaded from internet Oct. 30, 2015), p. 1.

\* cited by examiner

| 10 | 18 | 34 | 38 |
|---|---|---|---|
| VM1 | Virtual network adapter 1 | 9.1.2.3 | running |
| VM2 | Virtual network adapter 2 | 9.4.5.6 | suspended |

DYNAMICALLY ASSIGNING NETWORK ADDRESSES

PRIOR FOREIGN APPLICATION

This application claims priority from United Kingdom (GB) patent application number 1420129.7, filed Nov. 12, 2014, which is hereby incorporated herein by reference in its entirety.

BACKGROUND

One or more aspects relate in general to data processing systems, and in particular, to dynamically assigning network addresses provided by a server in a network to virtual network adapters in virtual machines.

In virtualized computer systems, it may be desirable in certain circumstances to suspend a virtual machine (VM) and resume it at a later time. In order to save resources concerning, e.g. computing power, energy or memory, it may be worth suspending a virtual machine and resuming it at a later time. Also, for example, changes to the VM's configuration file cannot be made while the VM is executing. In order to make such changes, the VM is first suspended. This causes the VM execution to halt and the VM's state to be serialized and written to a file, commonly known as a checkpoint file or a suspend file. After the VM is suspended, the desired change can be made to the VM's configuration file. The VM having the changed configuration can then be resumed from the saved state.

Previously, the assignment and retrieval of permanent/static addresses to/from networked machines through a Dynamic Host Configuration Protocol (DHCP) server has been disclosed. Further, lease negotiation in DHCP, where a reservation request from a client to be assigned an IP address at a specific time in the future is received, has been disclosed.

SUMMARY

Shortcomings of the prior art are overcome and additional advantages are provided through the provision of a computer-implemented method of dynamically assigning network addresses provided by a server in a network to virtual network adapters in virtual machines. The computer-implemented method includes logging network addresses of the virtual machines in the network; combining one or more network addresses with information about at least one of suspending or resuming virtual machines by a control instance; and sending information about the network addresses of suspended virtual machines for its virtual network adapters with dynamically assigned network addresses to the server, wherein a reassignment of the dynamically assigned network addresses due to suspending virtual machines is prevented.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments, wherein is shown in.

DETAILED DESCRIPTION

As indicated, the assignment and retrieval of permanent/static addresses to/from networked machines through a Dynamic Host Configuration Protocol (DHCP) server has been disclosed. This enables a network administrator to manage all of the addresses for all networked machines through the centralized DHCP server, and in particular, allows the network administrator to reclaim a permanent or static IP address from a machine without having to physically go to the machine. This allows having a larger potential amount of VMs than IP addresses managed by the DHCP server due to an overcommitment.

The network administrator has the ability to assign and remove static addresses in a fashion similar to the assignment of dynamic and non-static reserved addresses through the centralized DHCP server. These static address assignments have an infinite lifetime, and require no renewal mechanism as with these other types of addresses. The network administrator also centrally reclaims these static addresses through the DHCP server without the necessity of physically going to each machine. Assigning static addresses reduces the over-commitment capabilities.

The assignment and indexing of such a static address follows a similar protocol as the assignment of the other types of Internet Protocol (IP) addresses. If the client request for a static address came through a relay agent, the DHCP server stores the address of the relay agent in the static record before assigning the static address to it. In such a situation, this address is used to send a RECLAIM message. The removal of static addresses is unique to the DHCP protocol. When an administrator wishes to remove a static address, the DHCP server sends a "DHCP RECLAIM" command to the machine. The machine then sends an ACK and immediately removes its address.

Lease negotiation in DHCP has also been disclosed, where a reservation request from a client to be assigned an IP address at a specific time in the future is received. Then, a specific IP address for the client to be assigned at the specific time requested is reserved and the specific IP address to the client is assigned after the specified time in response to receiving the assignment request from the client for the reserved IP address.

In accordance with an aspect of the present invention, the dynamically assigning of network addresses provided by a server in a network to virtual network adapters in virtual machines with increased availability of network resources is provided.

In the drawings, like elements are referred to with equal reference numerals. The drawings are merely schematic representations, not intended to portray specific parameters of aspects of the invention. Moreover, the drawings are intended to depict only typical embodiments of the invention and therefore should not be considered as limiting the scope of aspects of the invention.

Figure 1:
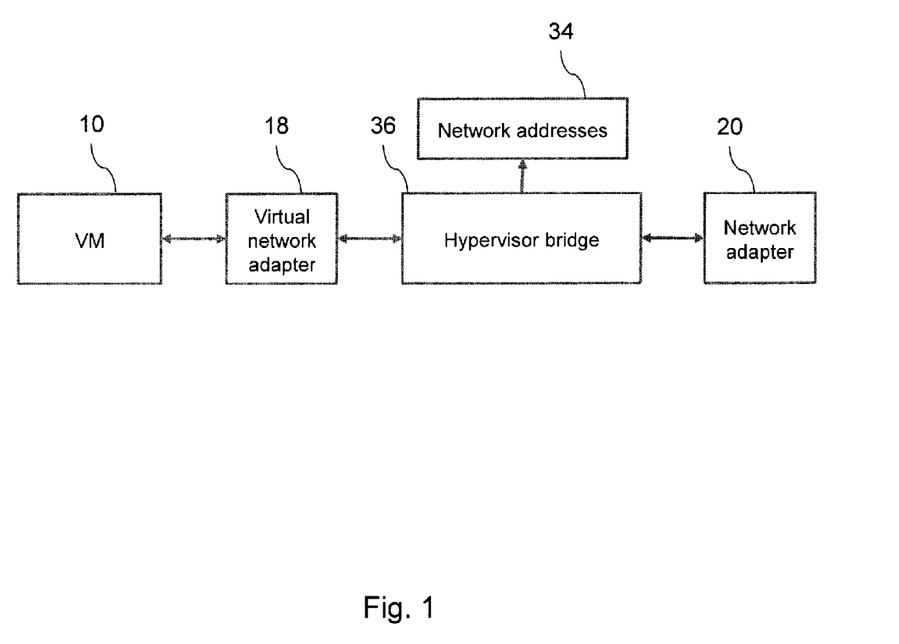
FIG. 1 a data flow for intercepting assigned network addresses of data packages in a network according to an embodiment of the invention.

FIG. 1 shows a data flow for intercepting assigned network addresses 34 of data packages in a network according to an embodiment of the invention. A virtual machine (VM) 10 is communicating to a network, not shown in FIG. 1, via a virtual network adapter 18, pushing rules in a hypervisor bridge 36, and a network adapter 20, representing the connection to the network. The hypervisor is binding the virtual network adapters 18 to the real network adapters 20 via the hypervisor bridge 36. According to one or more aspects, network addresses 34 may be intercepted at the hypervisor bridge 36 by a sniffer program 30 (FIG. 2), for example, implementing filtering rules for each of the VM MAC addresses. Each outcoming data package will be processed by the hypervisor kernel. Thus, the network addresses 34 can be extracted for each data package.

Figure 2:
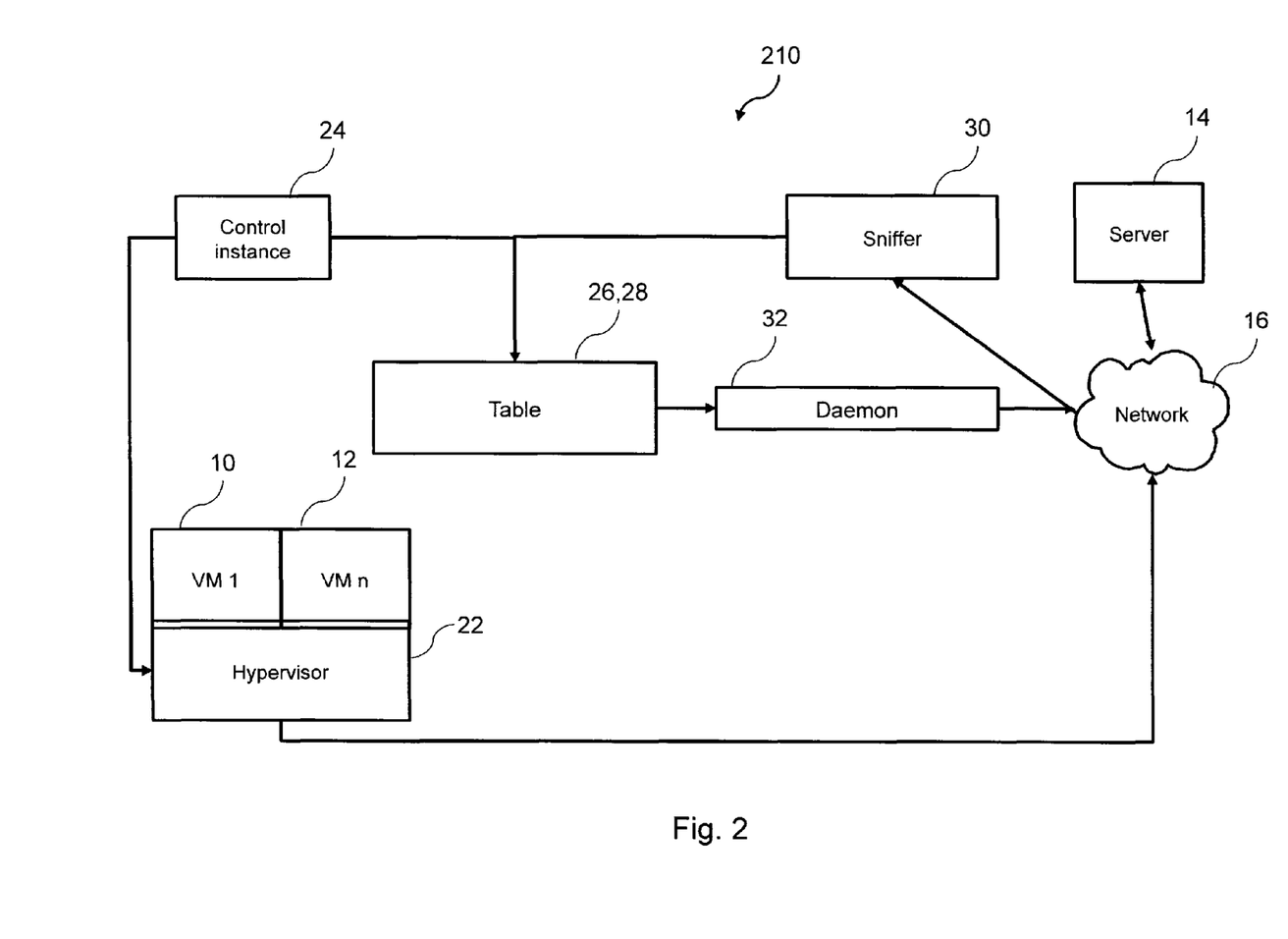
FIG. 2 an abstract implementation of an embodiment of the invention.

FIG. 2 depicts an abstract implementation of an embodiment of the invention. One or more aspects are intended for dynamically assigning network addresses 34 provided by a server 14 in a network 16 to virtual network adapters 18 in virtual machines 10, 12, wherein a reassignment of the assigned network addresses 34 due to suspending the virtual machines is prevented. Virtual network adapters 18, as well as network adapters 20, as shown in FIG. 1 are in FIG. 2 integrated in the hypervisor 22. The method includes logging network addresses 34 of the virtual machines 10, 12 in the network 16; combining network addresses 34 with information about suspending and/or resuming virtual machines by a control instance 24; and sending information about the network addresses 34 of suspended virtual machines 10, 12 for all its virtual network adapters 18 with dynamically assigned network addresses 34 to the server 14, the server 14 being configured as a DHCP server.

The control instance 24 is implemented for controlling the hypervisor 22. Alternatively, the control instance 24 could be implemented for controlling a whole distributed data processing system 210.

A sniffer 30 is used to collect network addresses 34 associated with MAC addresses of virtual machines 10, 12 from data packages sent on the network 16 to the server 14 and back. The sniffer 30 may at least be implemented in a same subnet of the network 16 as the server 14.

The keep-alive daemon 32 is used for periodically sending renewals of network addresses 34 of suspended virtual machines 10, 12 to the server 14.

Figure 3:
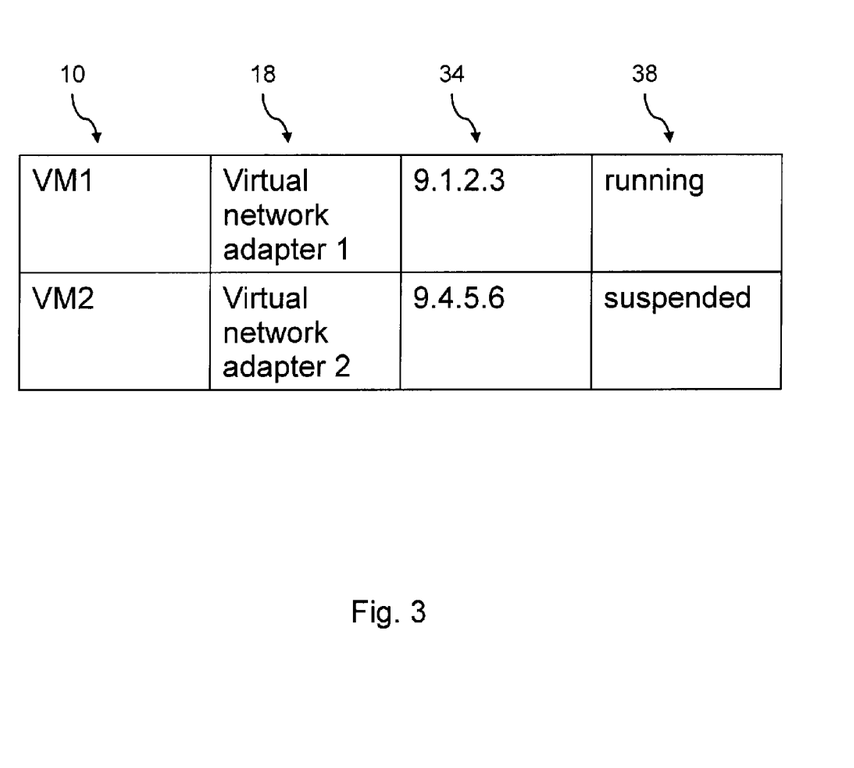
FIG. 3 a keep-alive daemon table according to an embodiment of the invention.

The table 26 with network addresses 34 and states of running and suspended virtual machines 10, 12, as shown in FIG. 3, is used for sending information to the server 14. For this table 26, an Ethernet bridge frame table 28 may be used for extracting information from data packages.

Dataflow is as follows, in one example. The sniffer 30 is intercepting the data package traffic from the virtual machines 10, 12 via the hypervisor 22 over the network 16 to the server 14 and back. The sniffer 30 extracts the network addresses 34 and sends them to the control instance 24. From there the table 26 is fed with the network addresses 34 as well as the state of the virtual machines 10, 12. The network addresses 34 of the suspended virtual machines are fed periodically by the keep-alive daemon 32 via the network 16 to the server 14.

In FIG. 3, a keep-alive daemon table according to an embodiment of the invention is shown. In the table, information about each virtual machine 10, its corresponding virtual network adapter 18, its network address 34 and the status of the VM 10: running or suspended is summarized. This information is used by a keep-alive daemon in order to provide the information about the corresponding network addresses 34 to the network.

Figure 4:
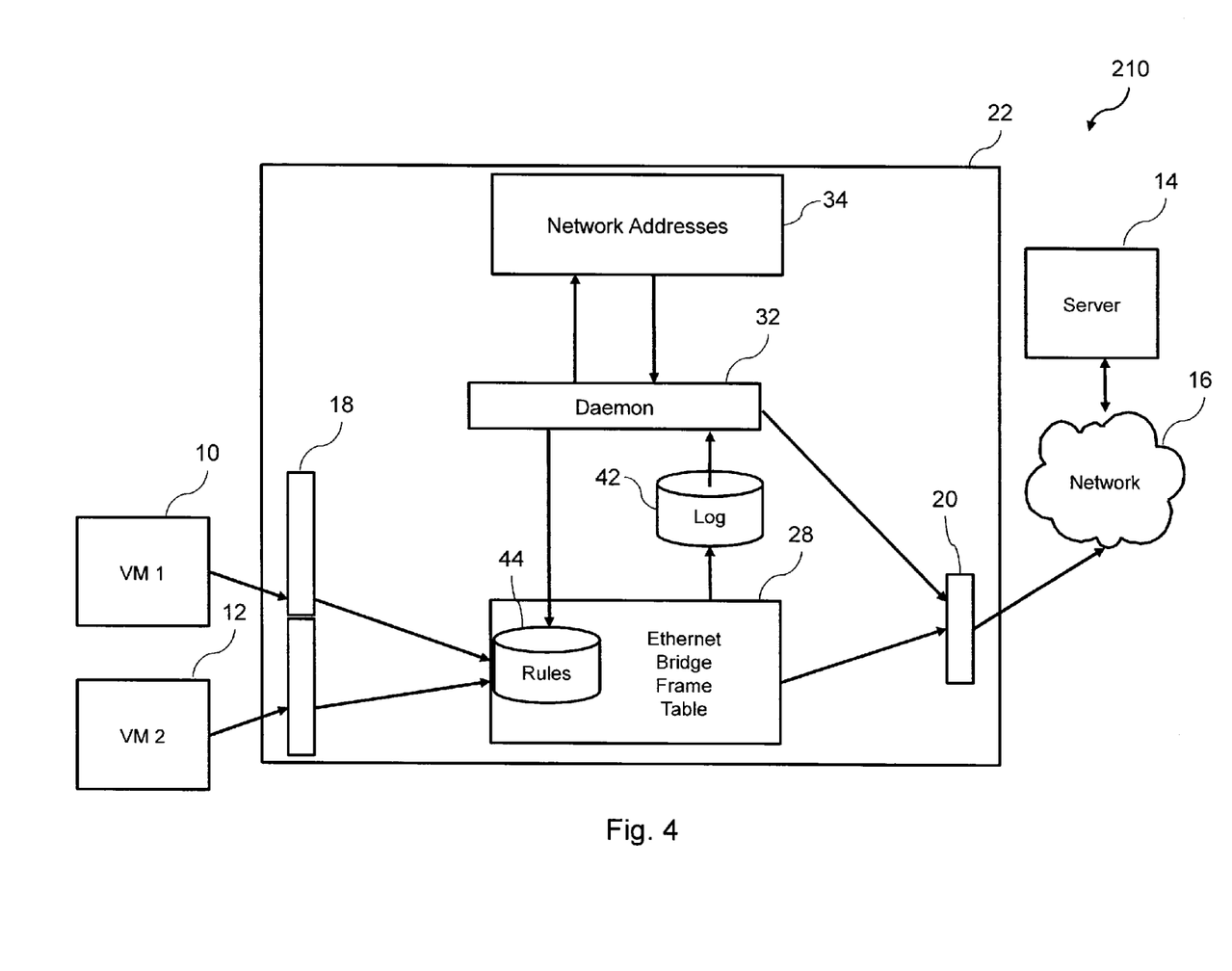
FIG. 4 a high level design of an embodiment of the invention.

In FIG. 4, a high level design of an embodiment of the invention is depicted. Assigned network addresses 34 are periodically renewed via a network communication from the respective virtual network adapter 18 to the server 14 in order to prevent their reassignment. The method thus includes, in one example, in response to suspending a virtual machine 10, 12, starting to periodically send renewals to the server 14 for all its virtual network adapters 18 with dynamically assigned network addresses 34; and in response to resuming the virtual machine 10, 12, stopping to send renewals to the server 14 for all its virtual network adapters 18 with dynamically assigned network addresses 34. In this embodiment, the control instance 24 is used for sending information about the network addresses 34 of suspended virtual machines 10, 12 for all its virtual network adapters 18 with dynamically assigned network addresses 34 to the server 14. Logging network addresses 34 of the virtual machines 10, 12 in the network 16 is performed by intercepting data packages sent between the server 14 and the virtual machines 10, 12 and extracting network addresses 34 from it.

The virtual machines 10, 12 are communicating via the virtual network adapters 18 to the Ethernet bridge frame table 28, implementing rules 44 for extracting network addresses 34 from the communication of the virtual machines 10, 12 to the server 14. The keep-alive daemon 32 sends information about the VMs 10, 12 for the extraction of the network addresses 34 to the table 28. In return the keep-alive daemon 32 gets the corresponding network addresses 34 from the table 28 as a log file 42 and sends them via the network adapter 20 to the network 16 and the server 14.

Figure 5:
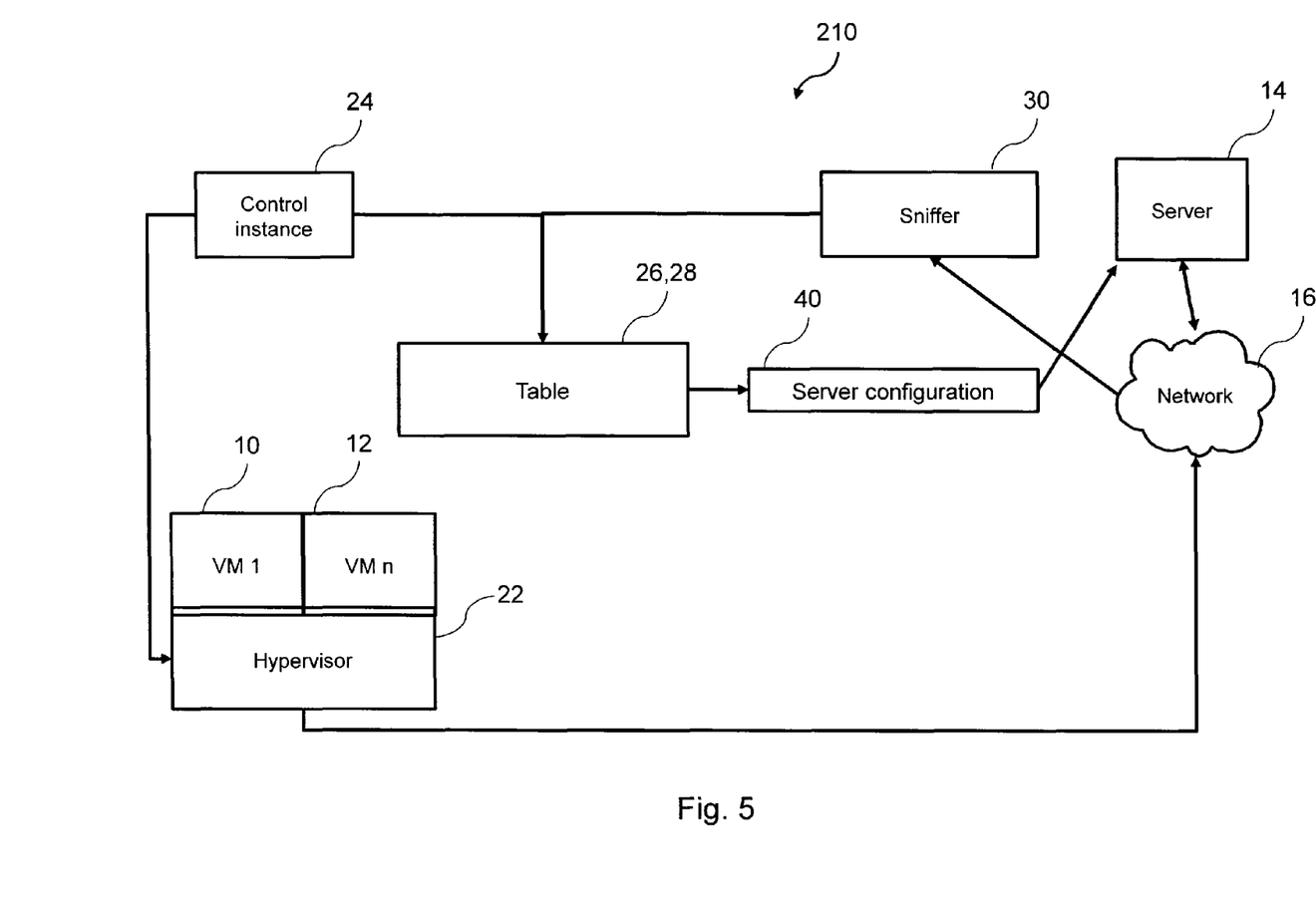
FIG. 5 an abstract implementation of an alternative embodiment of the invention.

FIG. 5 shows an abstract implementation of an alternative embodiment of the invention. Here, the assigned network addresses 34 are reconfigured in the server 14 in order to prevent their reassignment. Thus, the method in this embodiment includes, for instance, in response to suspending a virtual machine 10, 12, setting the network addresses 34 to a static state for all its virtual network adapters 18 with dynamically assigned network addresses 34; and in response to resuming the virtual machine 10, 12, setting the network addresses 34 to a dynamic state for all its virtual network adapters 18 with dynamically assigned network addresses 34. The server configuration 40 is updated directly to the server 14 without communicating over the network 16.

Dataflow is as follows, for instance. The sniffer 30 is intercepting the data package traffic from the virtual machines 10, 12 via the hypervisor 22 over the network 16 to the server 14 and back. The sniffer 30 extracts the network addresses 34 and sends them to the control instance 24. From there the table 26 is fed with the network addresses 34 as well as the state of the virtual machines 10, 12. The changes in the network addresses 34 of the suspended virtual machines from dynamic to static and vice versa are fed as server configuration 40 directly to the server 14.

Figure 6:
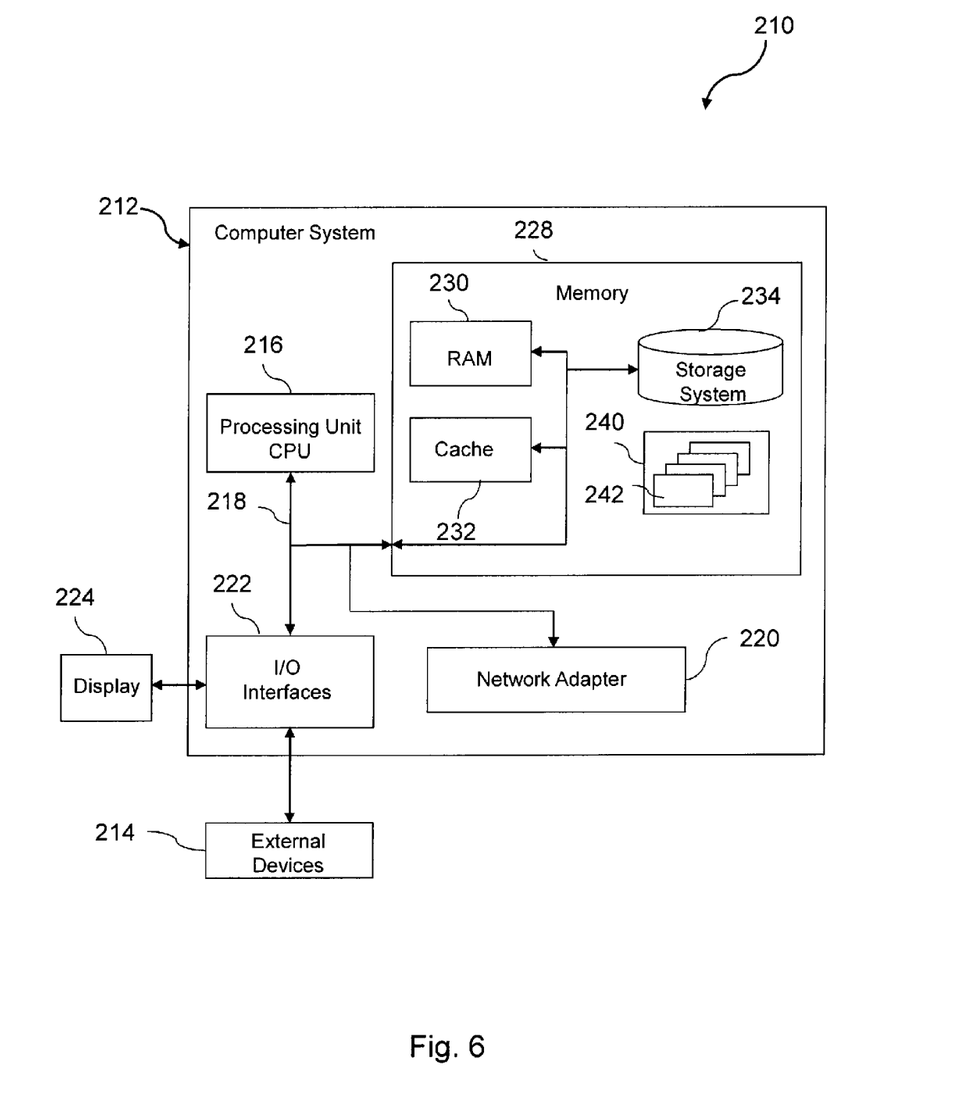
FIG. 6 an example embodiment of a data processing system for executing a method according to aspects of the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for suspending multiple virtual machines 10, 14 executed simultaneously by at least one hypervisors 20, 22 in at least one data processing system 210 comprising, for instance, sending, by a control instance 30, a request to the at least one hypervisor 20, 22 to suspend virtual machines 10, 14 at a given future first point in time; in response to receiving a request to suspend virtual machines 10, 14 from the control instance 30, the hypervisor 20, 22 determining if its virtual machines 10, 14 can be suspended at the first point in time, and, if the suspending is possible, returning a suspend handle 32, 34 to the control instance 30 and storing the suspend handle 32, 34, otherwise returning an invalid handle; when receiving a suspend handle 32, 34 from the hypervisor 20, 22 in return to the request to suspend virtual machines 10, 14, the control instance 30 sending a suspend command to the hypervisor 20, 22, wherein the respective suspend handle 32, 34 is provided to the corresponding hypervisor 20, 22; in response to receiving a suspend command with a suspend handle 32, 34 from the control instance 30, the hypervisor 20, 22 determining if the received suspend handle 32, 34 is equal to its stored handle and, if that is the case, suspending its virtual machines 10, 11 at the first point in time.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, a method for dynamically assigning network addresses provided by a server in a network to virtual network adapters in virtual machines with increased availability of network resources is provided.

Further, a data processing system for executing a method for suspending multiple virtual machines executed simultaneously by hypervisors with increased availability of network resources is provided.

According to one aspect of the invention, a method is provided for dynamically assigning network addresses provided by a server in a network to virtual network adapters in virtual machines, wherein a reassignment of the assigned network addresses due to suspending virtual machines is prevented. The method comprises logging network addresses of the virtual machines in the network; combining network addresses with information about suspending and/or resuming virtual machines by a control instance; and sending information about the network addresses of suspended virtual machines for all its virtual network adapters with dynamically assigned network addresses to the server.

DHCP is usually used together with lease expirations to reduce the amount of needed IP (internet protocol) addresses, for IP addresses are in some cases a scarce resource. So each client that obtained an IP address lease has to periodically renew it, so that the DHCP server does not assign the IP address to another system. Stopped virtual machines do not need to reserve an IP address. These IP addresses can be re-used by other VMs. When a virtual machine is suspended, then it fails to renew its IP address lease so that when the virtual machine is resumed after a long time, IP conflicts with another system may occur. This may be overcome by one or more aspects of the present invention.

Usually limited IP addresses are available. There exists only a small IP address range of e.g. 256 addresses. If there is a large amount of suspended VMs in a data processing system, resources are to be saved when not in use. On the other side, there may exist use cases that require to keep IP addresses. Often, usage scenarios do not allow the changing of IP addresses. Thus, connections may be reopened after resuming a VM. A tool setup requires additional effort if the IP address changes.

According to one or more aspects, a control instance is used, e.g. a hypervisor, to renew the lease on behalf of its suspended virtual machines. Usually a hypervisor does not know network addresses, because it is intended for hardware virtualization only. In order to renew the lease, the control instance uses three pieces of information, a list of suspended virtual machines, a list of MAC (media access control) addresses for each network adapter assigned to a suspended virtual machine, as well as an IP address for each network adapter assigned to a suspended virtual machine. Providing the IP address for each network adapter assigned to a suspended virtual machine is achieved by intercepting IP packages sent by the DHCP server to the guest operating system (OS) in the hypervisor and extracting the IP address from it. It does not require the OS (operating system) to get the information wanted. By this way, each outgoing IP package may be processed by the hypervisor kernel.

One or more aspects use, for instance, sniffer software, able to collect IP addresses associated to MAC addresses, and a control instance suspending/resuming machines, that knows about the MAC addresses used by the virtual machines. Typically, a management software is controlling a hypervisor. This management software could also be controlling physical machines with the capability to remotely suspend operating systems. Further, one or more aspects use a keep-alive daemon that sends DHCP renew packages for IP addresses of suspended machines.

In one or more aspects, there is no administrative access of the control instance to the server necessary for dynamically assigning network addresses. Also, the operating system does not need to be adapted for using the aspects of the invention.

According to one embodiment, assigned network addresses may be periodically renewed via network communication from the respective virtual network adapter to the server in order to prevent their reassignment, wherein the method includes in response to suspending a virtual machine, starting to periodically send renewals to the server for all its virtual network adapters with dynamically assigned network addresses; in response to resuming the virtual machine, stopping to send renewals to the server for all its virtual network adapters with dynamically assigned network addresses. By one or more aspects, IP addresses are reserved only for suspended VMs and not for powered-off VMs. A table with IP addresses used by running and suspended VMs is kept and renew packages in representation from suspended VMs are sent to the DHCP server.

According to a further embodiment, the server may be configured as a DHCP server. DHCP is usually used together with lease expirations to reduce the amount of needed network addresses. So each client that obtained a network address lease is to periodically renew it, so that the DHCP server does not assign the network address to another system. Thus, it is very efficient to use one or more aspects of the present invention in the environment of a DHCP server.

In one embodiment, a control instance may be used for sending information about the network addresses of suspended virtual machines for all its virtual network adapters with dynamically assigned network addresses to the server. Particularly, according to one or more aspects, a control instance, including a keep-alive daemon, is used to renew the lease on behalf of its suspended virtual machines.

Logging network addresses of the virtual machines in the network may be performed by intercepting data packages sent between the server that is managing the IP configuration and the virtual machines and extracting network addresses from it. Thus, it is possible to collect network addresses of data packages in the network, associated to MAC addresses, by a sniffer software.

In one embodiment, a table with network addresses and states of running and suspended virtual machines may be used for sending information to the server. Network addresses are added to the table for each new virtual machine or virtual network device.

For this purpose, an Ethernet bridge frame table, like so called ebtables, may be used for extracting information from data packages. Ebtables is an application program used to set up and maintain the tables of rules inside a Linux kernel, that inspect Ethernet frames.

According to an embodiment, a sniffer may be used to collect network addresses associated with MAC addresses of virtual machines from data packages. Thus, intercepting data packages sent between the server and the virtual machines and extracting network addresses from it can be conveniently implemented in one or more aspects of the present invention.

According to a further embodiment, the sniffer may be implemented in a same subnet of the network as the server. This is advantageous for collecting the network addresses of the data packages sent in the network between the server and the virtual machines.

Further, a keep-alive daemon may be used for periodically sending renewals of network addresses of suspended virtual machines to the server. If a VM is set to suspend mode, the keep-alive daemon gets a trigger by the hypervisor, and updates the state of the VMs (e.g. "suspend" or "running") in the table for persistent purposes. The keep-alive daemon sends regular keep-alive packages to the DHCP server using the network address of the VM as a source network address for all suspended VMs in the table.

Due to an embodiment, the control instance may be implemented for controlling the hypervisor. Thus, the control instance is operating independently from the hypervisor.

Yet according to another embodiment, in a different configuration, the control instance may also be implemented for controlling a distributed data processing system.

According to a further embodiment, assigned network addresses may be reconfigured in the server in order to prevent their reassignment. Hereby the method may include in response to suspending a virtual machine, setting the network addresses to a static state for all its virtual network adapters with dynamically assigned network addresses; and in response to resuming the virtual machine, setting the network addresses to a dynamic state for all its virtual network adapters with dynamically assigned network addresses. Thus, the network addresses are kept static and therefore, valid during the suspended state of the virtual machines and reactivated to a dynamic state after the virtual machine leaves the suspended state.

According to a further aspect of the invention, a data processing program for execution in a data processing system is proposed comprising an implementation of an instruction set for performing a method as described above when the data processing program is run on a computer.

Further, a computer program product is provided comprising a computer usable medium including a computer readable program, wherein the computer readable program when executed on a computer causes the computer to perform a method for dynamically assigning network addresses provided by a server in a network to virtual network adapters in virtual machines, wherein a reassignment of the assigned network addresses due to suspending virtual machines is prevented. The method comprises logging network addresses of the virtual machines in the network; combining network addresses with information about suspending and/or resuming virtual machines by a control instance; and sending information about the network addresses of suspended virtual machines for all its virtual network adapters with dynamically assigned network addresses to the server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A computer-implemented method of dynamically assigning network addresses provided by a server in a network to virtual network adapters in virtual machines, the computer-implemented method comprising:
    logging network addresses of the virtual machines in the network;
    combining, in a structure, one or more network addresses with state information about at least one of suspending or resuming virtual machines by a control instance; and
    based on suspending a virtual machine, periodically sending, using the structure, information about the network addresses of suspended virtual machines for its virtual network adapters with dynamically assigned network addresses to the server, wherein a reassignment of the dynamically assigned network addresses due to suspending virtual machines is prevented.

2. The computer-implemented method according to claim 1, further comprising periodically renewing one or more dynamically assigned network addresses via network communication from the respective virtual network adapter to the server in order to prevent their reassignment.

3. The computer-implemented method of claim 2, further comprising:
    based on suspending the virtual machine, starting to periodically send renewals to the server for its virtual network adapters with the dynamically assigned network addresses; and
    based on resuming the virtual machine, stopping to send renewals to the server for its virtual network adapters with the dynamically assigned network addresses.

4. The computer-implemented method according to claim 1, wherein the server is configured as a dynamic host configuration protocol server.

5. The computer-implemented method according to claim 1, wherein the sending information about the network addresses of suspended virtual machines uses a control instance.

6. The computer-implemented method according to claim 1, wherein the logging network addresses of the virtual machines in the network is performed by intercepting data packages sent between the server and the virtual machines and extracting network addresses.

7. The computer-implemented method according to claim 1, wherein the structure comprises a table with network addresses and states of running and suspended virtual machines.

8. The computer-implemented method according to claim 1, further comprising using a sniffer to collect network addresses associated with media access control addresses of virtual machines from data packages.

9. The computer-implemented method according to claim 8, wherein the sniffer is implemented in a same subnet of the network as the server.

10. The computer-implemented method according to claim 1, further comprising using a keep-alive daemon for periodically sending renewals of network addresses of suspended virtual machines to the server.

11. The computer-implemented method according to claim 1, further comprising reconfiguring one or more dynamically assigned network addresses in the server in order to prevent their reassignment.

12. The computer-implemented method according to claim 11, further comprising:
    based on suspending the virtual machine, setting at least one network address to a static state for its virtual network adapters with dynamically assigned network addresses; and
    based on resuming the virtual machine, setting the at least one network address to a dynamic state for its virtual network adapters with dynamically assigned network addresses.

13. A computer system for dynamically assigning network addresses provided by a server in a network to virtual network adapters in virtual machines, the computer system comprising:
    a memory; and
    a processor in communication with the memory, wherein the computer system is configured to perform a method, said method comprising:
        logging network addresses of the virtual machines in the network;
        combining, in a structure, one or more network addresses with state information about at least one of suspending or resuming virtual machines by a control instance; and
        based on suspending a virtual machine, periodically sending information, using the structure, about the network addresses of suspended virtual machines for its virtual network adapters with dynamically assigned network addresses to the server, wherein a reassignment of the dynamically assigned network addresses due to suspending virtual machines is prevented.

14. The computer system according to claim 13, wherein the method further comprises periodically renewing one or more dynamically assigned network addresses via network communication from the respective virtual network adapter to the server in order to prevent their reassignment.

15. The computer system of claim 14, wherein the method further comprises:
   based on suspending the virtual machine, starting to periodically send renewals to the server for its virtual network adapters with the dynamically assigned network addresses; and
   based on resuming the virtual machine, stopping to send renewals to the server for its virtual network adapters with the dynamically assigned network addresses.

16. The computer system according to claim 13, wherein the method further comprises:
   reconfiguring one or more dynamically assigned network addresses in the server in order to prevent their reassignment;
   based on suspending the virtual machine, setting at least one network address to a static state for its virtual network adapters with dynamically assigned network addresses; and
   based on resuming the virtual machine, setting the at least one network address to a dynamic state for its virtual network adapters with dynamically assigned network addresses.

17. A computer program product for dynamically assigning network addresses provided by a server in a network to virtual network adapters in virtual machines, the computer program product comprising:
   a non-transitory computer readable storage medium readable by a processing circuit and storing instructions for execution by the processing circuit for performing a method comprising:
   logging network addresses of the virtual machines in the network;
   combining, in a structure, one or more network addresses with state information about at least one of suspending or resuming virtual machines by a control instance; and
   based on suspending a virtual machine, periodically sending, using the structure, information about the network addresses of suspended virtual machines for its virtual network adapters with dynamically assigned network addresses to the server, wherein a reassignment of the dynamically assigned network addresses due to suspending virtual machines is prevented.

18. The computer program product according to claim 17, wherein the method further comprises periodically renewing one or more dynamically assigned network addresses via network communication from the respective virtual network adapter to the server in order to prevent their reassignment.

19. The computer program product of claim 18, wherein the method further comprises:
   based on suspending the virtual machine, starting to periodically send renewals to the server for its virtual network adapters with the dynamically assigned network addresses; and
   based on resuming the virtual machine, stopping to send renewals to the server for its virtual network adapters with the dynamically assigned network addresses.

20. The computer program product according to claim 17, wherein the method further comprises:
   reconfiguring one or more dynamically assigned network addresses in the server in order to prevent their reassignment;
   based on suspending the virtual machine, setting at least one network address to a static state for its virtual network adapters with dynamically assigned network addresses; and
   based on resuming the virtual machine, setting the at least one network address to a dynamic state for its virtual network adapters with dynamically assigned network addresses.

\* \* \* \* \*